United States Patent [19]

Jonnes

[11] 3,714,115

[45] Jan. 30, 1973

[54] ELASTOMERIC COMPOSITION OF NEOPRENE, POLYETHER POLYPRIMARY POLYAMINE AND A BASIC CURING AGENT

[75] Inventor: Nelson Jonnes, Stillwater, Minn.

[73] Assignee: Minnesota Mining and Manufacturing Company, St. Paul, Minn.

[22] Filed: Nov. 2, 1970

[21] Appl. No.: 86,285

[52] U.S. Cl. .........260/41.5 A, 260/41.5 R, 260/836, 260/837 R, 260/890
[51] Int. Cl. .............................................C08d 9/10
[58] Field of Search.....................260/890, 836, 41.5

[56] References Cited

UNITED STATES PATENTS 3,459,694 8/1969 Bowman..............................260/23.7
3,436,359 4/1969 Hubin et al...............................260/2
3,373,123 3/1968 Brice......................................260/2.5
3,308,204 3/1967 Bugel ...................................260/837

Primary Examiner—Murray Tillman
Assistant Examiner—John Seibert
Attorney—Kinney, Alexander, Sell, Steldt & Delahunt

[57] ABSTRACT

Curable elastomeric compositions comprising neoprene, at least one neoprene curing agent, and a polyether polyprimary polyamine having a polyether moiety containing recurring oxyalkylene groups in which the alkylene has from two to six carbon atoms, said polyether polyprimary polyamine having a molecular weight of at least about 3500 and cured products obtained therefrom.

12 Claims, No Drawings

ELASTOMERIC COMPOSITION OF NEOPRENE, POLYETHER POLYPRIMARY POLYAMINE AND A BASIC CURING AGENT

This invention relates to novel curable elastomeric compositions which can be cured to elastomers having a good balance of physical properties.

Among the many elastomers commercially available neoprene is known to possess excellent mechanical properties, although it has generally only a moderate resistance to abrasion and limited tear strength and therefore is not suitable for many applications, even if the neoprene is appropriately compounded with reinforcing fillers.

It has now been found that polyether polyprimary polyamines may be admixed with neoprene in the presence of a neoprene curing system, preferably with a reinforcing pigment, to provide a composition which can be cured to an elastomer having surprisingly good combination of resistance to abrasion and resistance to tear, together with other desirable properties, such as tensile strength, elongation and hardness, which are of value in a tough rubber. Within the scope of this invention a significant improvement in tear strength of neoprene can be achieved without sacrifice of other desirable elastomeric properties. These curable compositions may be formulated with sufficient solvent to provide a composition which can be coated or cast prior to curing and which can serve as an adhesive for bonding a variety of surfaces, e.g. neoprene, metal, plastics, wood, ceramics and glass. The composition of this invention may also be formulated with little or no solvent to provide a rubber base stock which can be milled on a conventional rubber mill and cured to form a useful elastomer, following the general procedures in the rubber industry.

Any of the various types of neoprene can be used, including the sulfur-modified (types GN, GNA and GRT) and the non-sulfur modified varieties (types W and WRT). The sulfur modified types are prepared by interpolymerization with sulfur and generally contain thiuram disulfide stabilizers. The different types of neoprenes, neoprene curing systems and their processing are described in *The Neoprenes*, by R.M. Murray and D.D. Thompson E.I.DuPont DeNemours, Wilmington, Del. (1963).

The polyether polyprimary polyamines of this invention have a polyether moiety composed of recurring oxyalkylene groups in which the alkylene radical has from two to six carbon atoms, the molecular weight being at least 3500, generally between about 4,000 and 20,000, preferably from 5000 to 15,000 because those with molecular weights above 20,000 are more difficult to process and do not normally provide optimum properties in the cured product. It is desirable to use polyether polyamines with a high degree of terminal amine functionality, such as at least 70%, preferably at least 90 percent, of theoretical (i.e. in the theoretical limit all terminal groups are primary amino groups), since polyethers with only one terminal amino group serve primarily as plasticizers in the formulation. Most preferred are the polyether polyprimary polyamines of U.S. Pat. No. 3,436,359, which have a high primary amine functionality, i.e. at least 90 percent primary amine terminal groups. Such preferred polyether polyamines have molecular weights of at least 3,500 and have terminal primary amino groups attached directly to each end of a polyether moiety containing recurring groups of which at least a major portion consists of oxytetramethylene recurring units and at most a minor portion consists of another oxyalkylene or thioalkylene recurring units having from two to six straight chain carbon atoms, at least half of the primary amino terminal groups having the structure $-OC_4H_8NH_2$, the polyether moiety having less than about 3 percent by weight of secondary amino nitrogen atoms and less than about 0.3 percent by weight of tertiary amino nitrogen atoms in its essentially linear chain.

The neoprene curing system can be of two general types. In the first type, the curing system comprises an organic base having a base strength at least that of benzylamine, especially an aliphatic amine (including the salts thereof, such as the carbamate salts) e.g. hexamethylenediamine, benzyldimethylamine, tris(dimethylaminomethyl)-phenol, dicyandiamide, etc. The second type of curing system is used when the composition contains epoxy compound having an oxirane equivalence greater than 1, preferably about 1.5 to 2.2, "oxirane equivalence" being defined as the number of oxirane equivalents per molecule. To avoid excessive hardness, the oxirane/amine equivalence ratio is preferably no more than about 25, the oxirane/amine equivalence being defined as the number of oxirane equivalents present in the total weight of epoxy resin divided by the number of amine-attached, active hydrogen equivalents present in the total weight of the polyether polyprimary polyamine. Monoepoxides act as plasticizers but do not contribute directly to the tear strength of the cured product. Since the aliphatic polyepoxides are not as effective in providing the improved tear strength, the epoxy resins containing some aromaticity are particularly preferred. Included in this preferred category are the epoxy compounds derived from diglycidyl ethers of polyphenols, such as 2,2-bis(parahydroxy phenyl) propane (also known as "bis-phenol A"). Epoxy-amine reaction catalysts, such as the soluble metal salts of organic acids, e.g. salts of metals in groups IIB, IVB and VII of the Periodic Table, may be used with the epoxy compounds to further improve the product, particularly such salts as stannous octoate, cobalt naphthenate, zinc acetate, stannous oleate, dibutyl tin dilaurate. This second type of curing system includes inorganic metal oxide bases, e.g. zinc oxide, magnesium oxide, etc. and/or organic bases having a base strength at least that of benzylamine, as described earlier.

Other additives may be included in conventional manner to improve processability and/or to improve the processability and/or to improve the physical properties of the cured products, such as processing aids, antioxidants, plasticizers, pigments, weakly basic amines (e.g. methylene dianiline), and low molecular weight polyether diamines, even though such amines may occasionally decrease the scorch resistance of the formulation. Reinforcing pigments are generally most advantageous to obtain maximum tear strength, and at least about 25 parts by weight (e.g. 60–180 parts) of a reinforcing pigment, such as silica, carbon black, titanium dioxide, talc, etc. based on 100 parts by weight of neoprene, is therefore preferred, the upper limit being determined primarily by the particular use of the composition. For example, less reinforcing filler is normally present for adhesive use. Silica is particularly preferred when the composition is intended for molded products as compared to the solution formulations used for adhesives and coatings.

Useful elastomeric products are provided with a wide variation in the relative quantities of the several components. The ratio of polyether polyprimary polyamine to the neoprene generally ranges from 1:20 to 10:1, preferably from 1:10 to 2:1 in the absence of an epoxy compound and from 1:4 to 5:1 in the presence of an epoxy compound. The neoprene curing agents are included in quantities conventional for neoprene curing, or even in slightly larger quantities.

Because of the unusual combination of abrasion resistance, strength, elongation at break and tensile at break, these products are tough rubbers which are particularly suitable for extreme duty use, such as in solid tires or tread stock for forklift trucks and off-the-road vehicles, die cutter bed coverings, O-rings, shaft seals, gaskets, clutch facings, capstan rollers and the like.

EXAMPLE 1

A coating solution was prepared by mixing and then milling on a three roll paint mill the following ingredients:

| | Parts by Wt. |
|---|---|
| polytetramethylene oxide diprimary diamine solution (MW=10,000)(50% in toluene) | 100 |
| tris(dimethylaminomethyl) phenol | 2.0 |
| carbon black | 13.24 |
| diglycidyl ether of bis-phenol A (epoxy equiv.wt.=190) | 20.00 |
| 3-aminopropyl-trimethoxysilane | 2.81 |
| silicone oil ("DC200", a trademarked product of Dow Corning Company) | 1.40 |
| neoprene curing system | |
| magnesium oxide | 0.38 |
| stearic acid | 0.05 |
| zinc oxide | 0.48 |
| 2,2'-methylenebis-(4-methyl-6--tert.-butyl) phenol | 0.19 |
| ethylene thiourea | 0.05 |
| neoprene W solution (20% in toluene) | |

The neoprene solution was prepared from unmilled gum stock. The above formulation was coated onto a release carrier paper using a coating bar set with a 25 mil clearance. The film was allowed to dry and then was cured at room temperature for 48 hours. The dry film thickness was 10.3 mils. This film had a tensile strength of 2,300 psi on a one-quarter inch wide sample, as compared to 1,800 psi on a similar sample prepared without the neoprene solution and the neoprene curing agents, and the neoprene containing sample was tougher and significantly higher in tear strength at 340°F. This film can be used as a protective coating, particularly for rubber goods which otherwise are subject to attack by ozone.

EXAMPLE 2

The following three solutions were prepared:

| | Parts by wt. |
|---|---|
| Part A | |
| polytetramethylene oxide diprimary diamine (MW=10,000) | 100 |
| carbon black | 40 |
| 2,4,6-tri(dimethylaminomethyl)phenol | 7 |
| toluene | 103 |
| Part B | |
| polymerized diglycidyl ether of bis-phenol A (epoxy eq.wt.=190) | 65 |
| toluene | 53.5 |
| Part C | |
| neoprene Type W | 58.4 |
| magnesium oxide | 2.3 |
| carbon black | 11.0 |
| stearic acid | 0.3 |
| zinc oxide | 2.9 |
| toluene | 224.7 |

Part A was prepared by first mixing all ingredients with a high speed mixer and the milling for two passes on three roll paint mill. Following the milling, toluene was added to adjust the solids to 58.8 percent. Part C was prepared by milling on a two roll rubber mill all of the ingredients except the solvent. Following the milling, the rubber was chopped, placed in the solvent and churned for 2 days, at which time it was completely dissolved.

Sample solutions were prepared by mixing Part A solution (247 grams) and Part B solution (118.5 grams) and adding varying amounts of Part C solution to provide varying amounts of neoprene in the samples. After mixing the ingredients with a propeller type mixer for several minutes, the solutions were allowed to deaerate and were then used as a protective rubber coating. Test samples were prepared by coating the solution onto a release paper carrier, drying at room temperature for one week and then testing the physical properties. Test results are shown below. Tear strengths were measured as pounds per lineal inch on standard tensile test equipment (Instron) using Die C, several specimens being tested and reported for each sample.

| Sample | Wt.% neoprene based on total solids | Percent Elongation | Tensile psi | Tear Strength |
|---|---|---|---|---|
| a | 0 | 245 | 3500 | 640,450, 455,560, 640,335 |
| b | 2.0 | 264 | 3500 | 610,430 484,425 |
| c | 4.4 | 163 | 3200 | 610,690, 555,665 |
| d | 12.3 | 235 | 3100 | 410,440, 625 |
| e | 29.5 | 271 | 2900 | 440,550, 475,460 |
| f | 57.2 | 500 | 2600 | 275,385, 300,375 |
| g | 78.9 | 800 | 1900 | 290,290, 290,300 |
| h | 88.8 | 800 | 780 | 100,110, 125,125 |
| i | 98.5 | 800 | 612 | 110,110, 110,110 |

It is apparent that an improvement in tear strength is realized in samples (b) through (h), as compared to the value calculated on an additive basis from samples (a) and (i).

EXAMPLES (TABLES I AND II)

When formulating the samples in Tables I and II for the rubber mill the neoprene raw gum was first banded on the rubber mill and the fillers and curing ingredients commonly associated with neoprene incorporated in the usual manner. Specifically, a portion of the silica filler was introduced into the neoprene stock while banding on the rubber mill, and the zinc oxide, magnesium oxide, accelerators, antioxidants, and other components were then added during continued banding. Thereafter the polyether polyprimary polyamine, epoxy resin and additional silica filler were added alternately as required for easy handling of the batch. Finally, any catalysts such as stannous octoate and organic amine are incorporated before the batch was removed from the mill and molded. This procedure was used for the examples set forth in Tables I and II. In each occurrence the polyether moiety of the polyether diprimary diamines and the polyether disecondary and samples 9 and 10 were press cured at 320°F. for 20 minutes. In Table II samples 13–25 were press cured at 320°–340°F. for 30 minutes, samples 18–20 and 23–25 being subsequently post cured at 350°F. for 30 minutes. Sample 11 was centrifugally cast at 220°F. for 120 minutes. Sample 11 was press cured at 320°F. for 20 minutes.

TABLE I

|  | 1 | 2 | 3 | 4 | 5 | 6 | 7 | 8 | 9 | 10 |
|---|---|---|---|---|---|---|---|---|---|---|
| Neoprene (Type KNR) |  |  |  |  |  |  |  |  |  | 100 |
| Neoprene (Type WB) | 100 | 100 | 100 | 100 | 100 | 100 | 100 | 100 |  |  |
| Neoprene (Type WRT) |  |  |  |  |  |  |  |  | 100 |  |
| Colloidal silica | 80 | 80 | 80 | 80 | 80 | 80 | 80 | 80 | 80 | 80 |
| Zinc oxdie |  |  |  |  | 5 | 5 | 5 | 5 |  |  |
| Magnesium oxide |  |  |  |  | 4 | 4 | 4 | 4 |  |  |
| Ethylene thiourea |  |  |  |  | 0.5 | 0.5 | 0.5 | 0.5 |  |  |
| Dioctyl sebacate | 5 | 5 | 5 | 5 | 5 | 5 | 5 | 5 |  |  |
| Zinc stearate |  |  |  |  | 5 | 5 | 5 | 5 |  |  |
| Antioxidant [1] |  |  |  |  | 1 | 1 | 1 | 1 |  |  |
| $H_2N(C_4H_8O)_nC_4H_8NH_2$ (10,000 molecular weight) |  | 25 | 75 | 25 |  | 25 | 50 | 75 | 100 | 100 |
| Stannous octoate | 13 | 13 | 13 |  |  |  |  |  |  |  |
| 2,4,6,-tri(dimethylaminomethyl)phenol | 3 | 3 | 3 | 3 |  |  |  |  |  |  |
| Tear strength (lb./in. thickness) | 227 | 460 | 510 | 488 | 367 | 330 | 254 | 213 | 149 | 95 |
| Shore A hardness | 76 | 76 | 76 | 79 | 92 | 74 | 69 | 66 | 58 | 63 |
| Tensile at break (p.s.i.) | 1,529 | 2,752 | 1,921 | 2,670 | 1,955 | 2,275 | 2,630 | 2,591 | 968 | 744 |
| Elongation at break (percent) | 140 | 525 | 450 | 515 | 645 | 900 | 850 | 800 | 640 | 400 |
| Permanent set (percent) | 7 | 15 | 8 | 17 | 37 | 74 | 80 | 61 | 53 | 33 |
| 100% modulus (p.s.i.) | 1,072 | 434 | 323 | 227 | 389 | 288 | 305 | 256 | 196 | 218 |
| 300% modulus (p.s.i.) |  | 1,675 | 1,306 | 1,543 | 1,055 | 569 | 588 | 518 | 439 | 624 |

[1] 2,2'-methylenebis (4-methyl-6 tert-butyl phenol).

TABLE II

|  | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|
| Neoprene (Type GRT) |  | 100 | 100 | 100 |  |  |  |  |  |  |  |  |  |  |  |
| Neoprene (Type S) |  |  |  |  |  | 100 | 100 |  |  |  |  |  |  |  |  |
| Neoprene (Type WD) | 100 |  |  |  |  |  |  |  |  |  |  |  |  |  |  |
| Neoprene (Type WRT) |  |  |  |  | 100 |  |  | 100 | 100 | 100 | 100 | 100 | 100 | 100 | 100 |
| Tetramethyl thiuram monosulfide |  |  |  |  |  |  |  |  | 0.75 | 0.75 |  |  | 0.75 | 0.75 | 0.75 |
| Ortho tolyl guanidine |  |  |  |  |  |  |  |  | 0.75 | 0.75 |  |  | 0.75 | 0.75 | 0.75 |
| Colloidal silica | 100 | 105 | 100 | 180 | 130 | 130 | 130 | 130 | 130 | 130 | 130 | 80 | 130 | 130 |  |
| Zinc oxide | 5 | 5 | 5 | 5 | 5 | 5 | 5 | 5 | 5 | 5 | 5 | 5 | 5 | 5 |  |
| Magnesium oxide | 4 | 4 | 4 | 4 | 4 | 4 | 4 | 4 | 4 | 4 | 4 | 4 | 4 | 4 |  |
| Ethylene thiourea | 0.5 |  |  |  |  |  |  |  |  |  |  |  |  |  |  |
| Dioctyl sebacate | 20 |  | 10 |  | 20 | 20 |  |  |  |  |  |  |  |  |  |
| Zinc stearate | 4 | 10 | 10 | 10 | 10 | 10 | 10 | 10 | 10 | 10 | 10 | 10 | 10 | 10 |  |
| Circulite oil** |  | 5 |  |  |  |  |  |  |  |  |  |  |  |  |  |
| Antioxidant* | 1 | 1 |  |  |  |  |  |  |  |  |  |  |  |  |  |
| Sulfur |  |  |  |  |  |  |  | 1 | 1 | 1 |  |  | 1 | 1 | 1 |
| Iron oxide | 5 |  |  |  |  |  |  |  |  |  |  |  |  |  |  |
| Polyether disecondary diamine (MW-9,000) |  |  |  |  |  |  |  |  |  |  |  | 100 |  |  |  |
| Polyether diprimary diamine (MW-3,800) |  |  |  |  |  |  |  |  |  |  | 100 |  |  |  |  |
| Polyether diprimary diamine (MW-10,000) | 100 | 100 | 50 | 100 | 300 | 100 | 100 | 100 | 100 | 100 |  |  |  | 100 | 100 |
| Stannous octoate | 15 | 24 | 12 | 24 | 72 | 24 | 12 | 12 |  | 12 | 24 | 24 |  |  |  |
| 2,4,6-tri(dimethylaminomethyl)phenol | 2.5 | 5 | 2.5 | 5 | 15 | 5 | 2.5 |  |  |  | 5 | 5 |  |  |  |
| Epoxy resin (epoxy equiv. wt. 190) | 50 | 50 | 25 | 50 | 150 | 50 | 50 | 25 | 25 |  | 50 | 50 |  |  |  |
| Epoxy resin (epoxy equiv. wt. 1,000) |  |  |  |  |  |  |  |  |  | 50 |  |  |  |  |  |
| Dicyandiamide |  |  |  |  |  |  |  |  |  | 0.8 |  |  |  |  | 0.8 |
| Epoxy resin (epoxy equiv. wt. 500) |  |  |  |  |  |  |  |  |  |  |  |  |  | 25 | 25 |
| Tear strength (#/in. thickness) | 255 | 585 | 609 | 686 | 692 | 519 | 322 | 628 | 577 | 595 | 265 | 203 | 283 | 688 | 792 |
| Shore A hardness | 64 | 69 | 82 | 80 | 79 | 77 | 71 | 78 | 77 | 83 | 94 | 84 | 73 | 75 |  |
| Tensile at break (p.s.i.) | 5,500 | 3,100 | 2,931 | 2,865 | 2,773 | 2,557 | 2,547 | 2,272 | 2,730 | 2,681 | 2,378 | 1,319 | 913 | 3,243 | 3,456 |
| Elongation at break (percent) | 590 | 670 | 600 | 640 | 520 | 645 | 692 | 590 | 445 | 400 | 400 | 740 | 100 | 380 | 480 |
| Permanent set (percent) | 15 | 28 | 18 | 25 | 22 | 29 | 29 | 18 | 8 | 3 | 12 | 72 | 9 | 0 | 6 |
| 100% modulus (p.s.i.) | 300 | 500 | 543 | 566 | 555 | 471 | 303 | 584 | 520 | 986 | 1,612 | 398 |  | 609 | 585 |
| 300% modulus (p.s.i.) |  |  | 1,688 | 1,531 | 1,867 | 1,369 | 1,074 | 1,688 | 2,035 | 2,170 |  | 710 |  | 2,617 | 2,660 |

*2,2'-methylenebis-(4-methyl-6-tert.-butyl)phenol.
**Naphthonic oil with aniline point of 156° F. (69° C.).

diamines was polyoxytetramethylene. Examples 1, 5–11, 22 and 23 in Tables I and II do not fall within the present invention and are presented only for comparison. All epoxy resin in Tables I and II are derived from diglycidyl ether of bis-phenol A. The variations in curing conditions among certain of the examples do not change the comparative value of the results. In Table I samples 1–8 were press cured at 320°F. for 15 minutes

What is claimed is:

1. Curable elastomeric compositions comprising neoprene, at least one neoprene curing agent selected from the group consisting of an aliphatic amine base having a base strength at least that of benzylamine and a basic inorganic metal oxide, and a polyether polyprimary polyamine having a polyether moiety containing recurring oxyalkylene groups in which the alkylene has from two to six carbon atoms, said polyether polyprimary polyamine having a molecular weight of at least about 3,500.

2. The curable elastomeric composition of claim 1 in which said neoprene curing agent comprises an aliphatic amine base having a base strength at least that of benzylamine.

3. The curable elastomeric composition of claim 1 in which said composition also comprises at least one epoxy compound having an oxirane equivalence greater than 1.

4. The curable elastomeric composition of claim 1 in which said composition contains at least 25 parts by weight of a reinforcing pigment per 100 parts of neoprene.

5. The curable elastomeric composition of claim 4 in which said reinforcing pigment is silica.

6. The curable composition of claim 1 in which the ratio of said polyether polyprimary polyamine to said neoprene is from about 1:20 to about 10:1.

7. The curable composition of claim 6 in which the ratio of said polyether polyprimary polyamine to said neoprene is from about 1:10 to about 2:1 or, when an epoxy compound having an oxirane equivalence greater than 1 is present, from about 1:4 to about 5:1.

8. The curable composition of claim 1 in which said polyether polyprimary polyamine is a polyether diprimary diamine having at least 90% of the theoretical primary amino termination.

9. An abrasion and tear resistant elastomer prepared by curing a mixture comprising neoprene and a polyether polyprimary polyamine having a molecular weight of at least 3,500 and a polyether moiety containing recurring oxyalkylene groups in which the alkylene has from two to six carbon atoms in the presence of at least one aliphatic amine base having a base strength at least that of benzylamine or a basic inorganic metal oxide.

10. The abrasion and tear resistant elastomer of claim 9 in which at least a major portion of the oxyalkylene recurring groups in said polyether polyprimary polyamine are oxytetramethylene groups.

11. The abrasion and tear resistant elastomer of claim 10 in which said mixture also contains an epoxy compound having an oxirane equivalence greater than one.

12. The curable elastomeric composition of claim 3 in which at least a major portion of the oxyalkylene recurring groups in said polyetherpolyprimary polyamine are oxytetra-methylene groups.

* * * * *

UNITED STATES PATENT OFFICE
CERTIFICATE OF CORRECTION

PATENT NO. : 3,714,115
DATED : January 30, 1973
INVENTOR(S) : Nelson Jonnes

It is certified that error appears in the above-identified patent and that said Letters Patent are hereby corrected as shown below:

Columns 5 and 6, Table I, line 2: "Neoprene (Type WB)" should read -

-- neoprene (Type WD) --.

Column 4, line 9, after word "and", the word "the" should read -

-- then --.

Signed and sealed this 13th day of May 1975.

(SEAL)
Attest:

RUTH C. MASON
Attesting Officer

C. MARSHALL DANN
Commissioner of Patents
and Trademarks